UNITED STATES PATENT OFFICE.

HEINRICH CLINGESTEIN, OF COLOGNE, GERMANY, ASSIGNOR TO FARBENFABRIKEN VORM. FRIEDR. BAYER AND CO., OF LEVERKUSEN, NEAR COLOGNE-ON-THE-RHINE, GERMANY.

AZO DYE.

No Drawing.  Application filed March 29, 1923.  Serial No. 628,566.

*To all whom it may concern:*

Be it known that I, HEINRICH CLINGESTEIN, a citizen of Germany, residing at Cologne-on-the-Rhine, Hermann Beckerstrasse 8, State of Prussia, have invented new and useful Improvements in an Azo Dye, of which the following is a specification.

I have found that new and valuable azo dyes for wool can be obtained by combining diazo compounds of benzene derivatives containing an alkylacidylamino group e. g. para-aminoethylacetanilid, 2-ethylacetylamino-4-toluidin, 5-ethylacetylamino-2-toluidin, 4 ethylacetylamino-2-toluidin, 2-ethylacetylamino-4-toluidin with azo dyestuff components e. g. ortho- or para-methoxyphenyl-2-amino-8-naphthol-6-sulfonic acid, 2-phenylamino-8-naphthol-6-sulfonic acid, para-ethylacetylaminophenyl-2-amino-8-naphthol-6-sulfonic acid, 1.2-chloro-4- or 5-sulfophenyl-3-methyl-5-pyrazolon, 1.2.5- dichloro-4-sulfophenyl-3-methyl-5-pyrazolon etc.

My new dyes are after being dried and pulverized in the shape of their alkali metal salts dark powders soluble in water generally with a yellow to brown and in concentrated sulfuric acid generally with a reddish coloration. They yield upon reduction with stannous chlorid and hydrochloric acid an alkylacidylamino compound of the benzene series and the amino compound of the azo compound used. They dye wool from yellow to brown to blue-red shades fast to milling which are distinguished for their good equalizing properties.

In order to illustrate my invention more fully the following example is given, the parts being by weight :—19, 2 parts of 4-ethylacetylamino-2-toluidin are diazotized in the usual manner with 28 parts of a 20 per cent hydrochloric acid and 6, 9 parts of sodium nitrite and the diazo compound is then coupled with 35 parts of para-methoxyphenyl-2-amino-8-naphthol-6-sulfonic acid (100 per cent) in an alkaline solution containing sodium carbonate. The dye is salted out, filtered off and dried.

It is after being dried and pulverized in the shape of its sodium salt a brownish powder soluble in water with a yellowish-red and in concentrated sulfuric acid with a red coloration. Upon reduction with stannous chlorid and hydrochloric acid it is split up into 4-ethylacetylamino-2-toluidin and para-methoxyphenyl-2.7-diamino-8-naphthol-6-sulfonic acid. It dyes wool from acid baths yellowish-brown shades fast to milling.

I claim:

1. The herein described new monazo dyestuffs being derived from an amino compound of the benzene series containing an alkylacidylamino group and an azo dyestuff component, which are, after being dried and pulverized in the shape of their alkali metal salts, dark powders soluble in water generally with a yellowish to brown and in concentrated sulfuric acid generally with a red coloration; yielding upon reduction with stannous chlorid and hydrochloric acid an alkylacidylamino compound of the benzene series and the amino compound of the azo component used; dyeing wool from yellow to brown to blue-red shades fast to milling distinguished for their good equalizing properties, substantially as described.

2. The herein described monazo dye having in a free state most probably the formula:

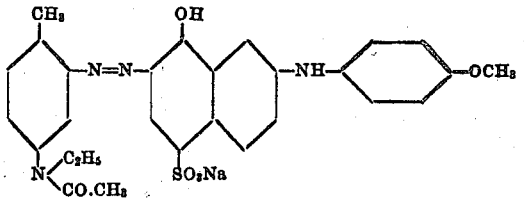

being in the shape of its dried and pulverized sodium salt a brownish powder soluble in water with a yellowish-red and in concentrated sulfuric acid with a red coloration; yielding upon reduction with stannous chlorid and hydrochloric acid 4-ethylacetylamino-2-toluidin and para-methoxyphenyl-2.7-diamino-8-naphthol-6-sulphonic acid; and dyeing wool from acid baths a pure yellowish brown shade fast to milling, substantially as described.

In testimony whereof I have hereunto set my hand.

HEINRICH CLINGESTEIN.